June 7, 1938. M. O. SNEDIKER 2,119,605
ALARM APPARATUS FOR TEMPERATURE CONTROL
Filed Aug. 13, 1936
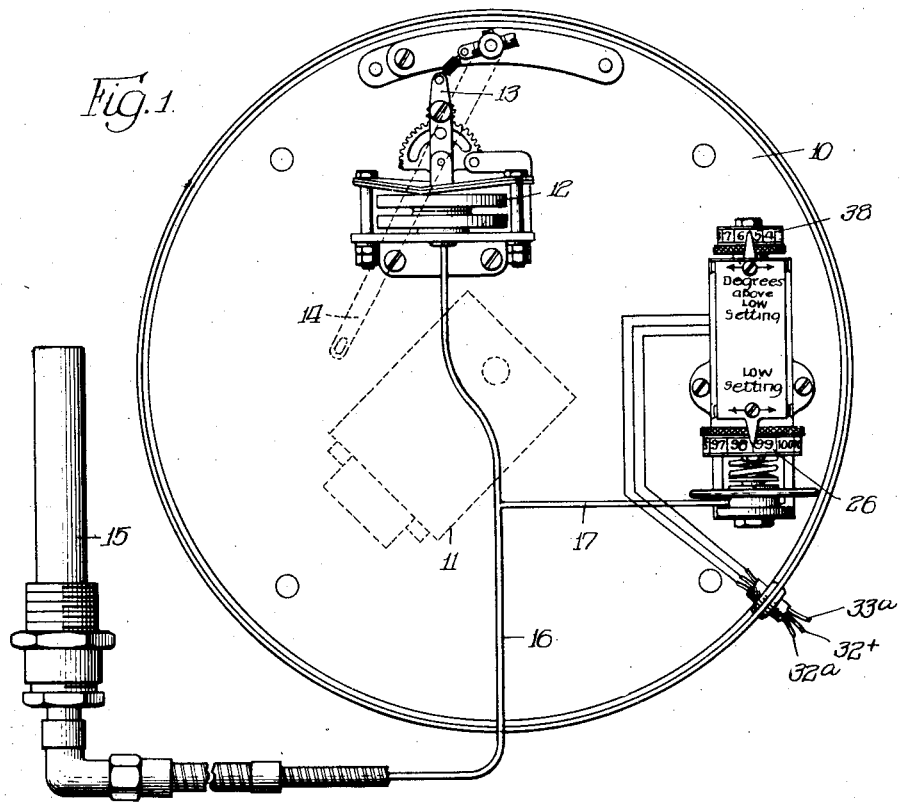
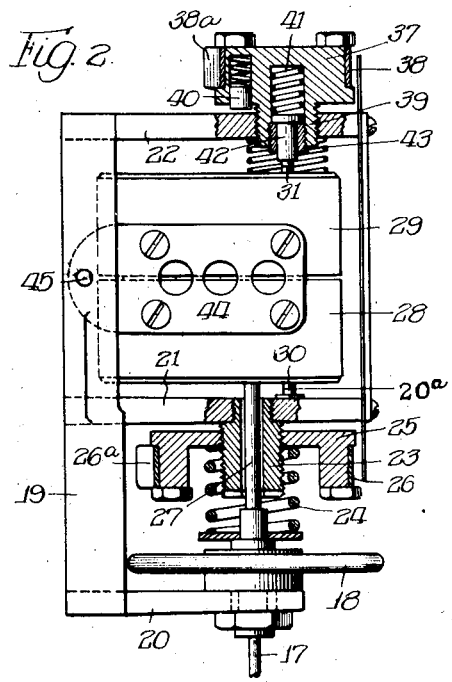
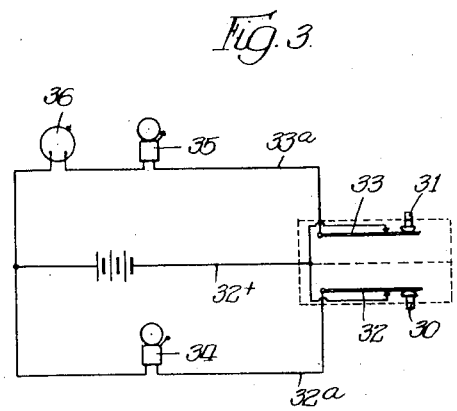
Inventor:
Marion O. Snediker Patented June 7, 1938

2,119,605

UNITED STATES PATENT OFFICE 2,119,605

ALARM APPARATUS FOR TEMPERATURE CONTROL

Morton O. Snediker, Chicago, Ill., assignor to The Powers Regulator Company, Chicago, Ill., a corporation of Illinois Application August 13, 1936, Serial No. 95,770

2 Claims. (Cl. 200—140)

My invention relates to apparatus particularly intended for use in connection with hydrotherapy treatments, in which it is imperative that a predetermined temperature be maintained. Usually in such cases a recording thermometer is employed in order that a record may be retained showing the actual heat application in terms of duration and temperature. I am aware that apparatus has been employed for indicating high and low temperature limits, in the nature of audible or visible means, and the apparatus here proposed is designed for securing the desired result with simplicity and certainty, including therewith means for varying not only the low temperature limit but the range of permissible temperatures above said low limit. In the construction disclosed the mechanism is adapted for use with equal advantage in connection with other heat controlling or indicating devices.

The invention will be more readily understood by reference to the accompanying drawing, in which;

Fig. 1 is an elevation of apparatus such as contemplated, the said apparatus being associated with a casing and mechanism of a recording thermometer;

Fig. 2 is an enlarged side elevation, partly in section, showing the alarm unit; and, Fig. 3 is a diagram of the wiring that may be used.

In the drawing I have shown a casing or housing 10 for a recording thermometer, the dial that would normally overlie the open side of the housing being omitted. Within the housing and indicated in dotted lines at 11 is suitable clockwork for rotating the dial, while the arm-actuating apparatus comprises the bellows 12 and the link mechanism 13 by which the pen arm 14, indicated in dotted lines, is moved. The bellows is actuated by means of pressure generated in a bulb 15, a capillary tube 16 serving as the means of connection. A branch 17 from the capillary tube enters a bellows 18 constituting the motor for the alarm unit about to be described.

The unit is carried in a frame 19 having three bracket arms 20, 21, 22, vertically spaced apart. The lower bracket 20 has a fixed stop 20a thereon and carries the bellows 18 while the intermediate bracket 21 carries a threaded projection 23 surrounded by a compression spring 24 that bears at its lower end against the bellows 18 and at its upper end against an adjusting nut 25. A flange depending from the nut carries temperature indications 26 that represent the low limit of temperature to be controlled. A stop member 26a formed as a part of the band that carries the indications serves to limit rotation of the nut to less than one revolution. A stem 27 projects upwardly from the bellows through an axial opening in the part 23, the stem bearing against the lower of a pair of circuit breakers 28, 29. The circuit breakers or switches are of a type obtainable on the market in which a snap action is secured by very slight movement of the movable part; this structure is shown in U. S. Patent No. 1,960,020. Since the actual construction of the switch forms no part of this invention, such construction is not illustrated or described herein. It is sufficient to say that the projecting portions 30, 31 of the buttons shown in Fig. 3 serve to actuate contact fingers 32, 33 to make and break the circuit shown in said figure. In the two circuits 33a, 32a, that are alternately opened and closed, I have indicated bells 34, 35, or I may, as shown in the upper circuit, include a light 36 in series with the bell. It will be understood that while I have indicated only alarm elements by means of which the operator is informed of temperature conditions audibly or visibly, yet I may connect the circuit to valve actuating means either to replace or supplement the alarm element, in which case the regulation will be effected automatically.

The mechanism for determining the range, or, in other words the high temperature limit, is mounted on the upper bracket 22 and includes a nut 37 having temperature range indicating figures 38 thereon, the nut having a threaded projection 39 operative through the bracket 22 and provided with a spring-pressed pin 40 adapted to provide controllable friction to the turning of the nut. The band that carries the range indicating figure thereon likewise has a stop 38a, the same as the stop 26a. The nut and projection has an axial opening containing a spring 41 bearing against a headed pin 42 acting as an adjustable stop that projects beyond the lower end of the threaded part 49 and registers with the button 31 that projects from the casing of the switch 29. By rotating the nut 37 the spacing of the pin 42 above the button 31, is controlled. A light spring 43 serves to return the combined switches as the bellows contracts. It will be noted that the two switch casings 28, 29 are joined by means of a plate 44, the rearwardly projecting portion of which provides a bearing for a pin 45 seated in the frame 19. Thus the switches are bodily moved or oscillated in unison.

As stated the alarm apparatus is preferably mounted within the casing of a recording thermometer as shown, the apparatus being available for change only by gaining access to the space behind the dial and beneath the cover which may be locked.

The operation is as follows:

Assuming a prescription that requires water treatment for a specified number of hours, the temperature to be maintained between 98 and 104 degrees F.; in that case the regulating nut 25 is turned to indicate the low temperature of 98. Then the adjusting nut 37 is turned so that the figure 6 is indicated by the pointer; this being the range specified. So long as the water temperature remains within that range, the buttons 30, 31 will remain in the position shown in Fig. 2; that is, with both circuits open. However, if the temperature drops to the low limit, the bellows 18 will contract allowing the spring 43 to swing the switch casing downward and to permit finger 33 actuated by the button 31 to close the circuit 33a, thus giving a warning to the operator. In case the temperature rises to 104, which is the upper permissive limit, then the bellows 18 will raise the switches and permit finger 32 to close the circuit 32a. Thus whatever low limit or range is desired can readily be provided by setting of the instrument.

The pin 42 backed by the spring 41, is so arranged in order to avoid breakage in case of an enforced adjustment that is not otherwise permitted by the position of the parts.

While I have illustrated apparatus in which electric current is utilized as the motive power, it should be understood that I contemplate other forms of motive power, such for example as air under pressure. In that case valves would replace the described circuit breakers. It should be understood, therefore, that in the accompanying claims, I intend this construction to be placed on the terms used therein.

I claim:—

1. In combination, a frame providing a pair of spaced stops, means for varying the distance between the stops, a pair of switches having actuating buttons registering with said stops, said switches and buttons being bodily movable in unison between the stops, a heat responsive element adapted to move said switches to close a circuit at predetermined variable high and low temperature limits.

2. In combination, a frame providing a pair of spaced stops, means for varying the distance between the stops, a pair of switches having actuating buttons registering with said stops, said switches being joined and pivoted for oscillation between said stops, and a heat responsive element adapted to move said switches to close two separate circuits at predetermined high and low temperature limits.

MORTON O. SNEDIKER.